US005819786A

United States Patent [19]

Nir

[11] Patent Number: 5,819,786
[45] Date of Patent: Oct. 13, 1998

[54] DEVICE FOR STORING AND DISCHARGING VISCOUS LIQUIDS

[76] Inventor: Ari Nir, 2600 Netherlands Ave., Bronx, N.Y. 10463

[21] Appl. No.: 780,368

[22] Filed: Jan. 9, 1997

Related U.S. Application Data

[63] Continuation-in-part of Ser. No. 615,811, Mar. 14, 1996, Pat. No. 5,651,386.

[51] Int. Cl.[6] .......... F16K 49/00

[52] U.S. Cl. .......... 137/340; 137/13; 165/104.14; 165/183

[58] Field of Search .......... 137/340, 338, 137/13; 165/104.14, 183

[56] References Cited

U.S. PATENT DOCUMENTS

| | | | |
|---|---|---|---|
| 1,417,292 | 5/1922 | Andrews | 137/338 |
| 1,975,937 | 10/1934 | Graham | 137/13 |
| 2,995,612 | 8/1961 | Hervert | 137/13 |
| 3,040,760 | 6/1962 | Macks | 137/13 |
| 3,195,820 | 7/1965 | Steinhardt, Jr. | 165/104.14 |
| 3,871,445 | 3/1975 | Wanka et al. | 165/104.14 |
| 4,657,074 | 4/1987 | Tomita et al. | 165/183 |
| 4,926,830 | 5/1990 | McNelley | 165/142 |

*Primary Examiner*—A. Michael Chambers

[57] ABSTRACT

A device for storing and discharging a viscous liquid for a tank which is adapted to accommodate a viscous liquid, the device has an outer tubular element adapted to be arranged inside the tank and open into its interior so that the viscous liquid fills a space inside the outer tubular element, an inner tubular element located inside an inner chamber of the outer tubular element and being substantially closed, means for supplying the viscous liquid into the outer tubular element and discharging liquid from the outer tubular element, means for supplying a heating medium into the inner tubular element so that the heating medium inside the inner tubular element gives out heat through a wall of the inner tubular element into the inner chamber of the outer tubular element and therefore to the viscous liquid so as to heat the viscous liquid and to reduce its viscosity, and for discharging the heating medium which has been cooled as a result of giving off the heat, the means for discharging the liquid from the outer tubular element including pump means having a suction inlet which is directly connected with a space between the outer tubular element and the inner tubular element so as to suck the viscous liquid from the space, the pump means being lowerable together with the outlet tubular element and the inner tubular element substantially to a bottom of the tank.

4 Claims, 1 Drawing Sheet

DEVICE FOR STORING AND DISCHARGING VISCOUS LIQUIDS

CROSS-REFERENCE TO A RELATED APPLICATION

This application is a continuation-in-part of patent application Ser. No. 08/615,811 filed on Mar. 14, 1996 now U.S. Pat. No. 5,651,386, issued Jul. 29, 1997.

BACKGROUND OF THE INVENTION

The present invention relates to devices for storing and discharging viscous liquids.

Viscous liquids are usually stored in tanks. The fluidity of the viscous liquids and therefore the ease with which they can be pumped decreases sporadically as its temperature falls. Therefore it is important that all viscous liquid storage devices or tanks can be heated. There are various types of heating elements provided in the viscous liquid storage devices. It is believed that they can be further improved as to their simplicity of construction, efficiency and easiness of handling.

SUMMARY OF THE INVENTION

Accordingly, it is an object of the present invention to provide a device for storing and discharging viscous liquids, which is a further improvement of the prior art and avoids the disadvantageous of the prior art.

In keeping with these objects and with others which will become apparent hereinafter, one feature of the present invention resides, briefly stated, in a device for storing and discharging a viscous liquid for a tank which is adapted to accommodate a viscous liquid, wherein the device has an outer tubular element adapted to be arranged inside the tank and open into its interior so that the viscous liquid fills an inner chamber of said outer tubular element; an inner tubular element located inside an inner chamber of said outer tubular element and being substantially closed; means for supplying the viscous liquid into a space between said outer tubular and said inner tubular element and discharging liquid from said outer tubular element; means for supplying a heating medium into said inner tubular element so that the heating medium inside said inner tubular element gives out heat through a wall of said inner tubular element into the inner chamber of said outer tubular element and therefor to the viscous liquid so as to heat the viscous liquid and to reduce its viscosity, and for discharging the heating medium which has been cooled as a result of giving off the heat, said means for discharging the liquid from said outer tubular element including oil pump means having a suction inlet which is directly connected with a space between said outer tubular element and said inner tubular element so as to suck said heated viscous liquid, said pump means being lowerable together with said outlet tubular element and said inner tubular element substantially to a bottom of the tank.

When the device is designed in accordance with the present invention, it is highly efficient, it has a simple construction, it is easy to manufacture and easy to handle. Since the pump means of the inventive device directly communicate with the viscous liquid chamber formed between the inner and outer tubular elements there is no intermediate suction line, and since the whole heat exchanging device including the inner tubular element and the outer element together with the pump means is lowerable into the viscous liquid to the bottom of the tank, the viscous liquids are easily withdrawable from the tank thruogh the discharge line and no cavitation of the heated viscous liquid occurs before the pump means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a device for storing and discharging a viscous liquid in accordance with the present invention.

DESCRIPTION OF PREFERRED EMBODIMENTS

Figure 1:
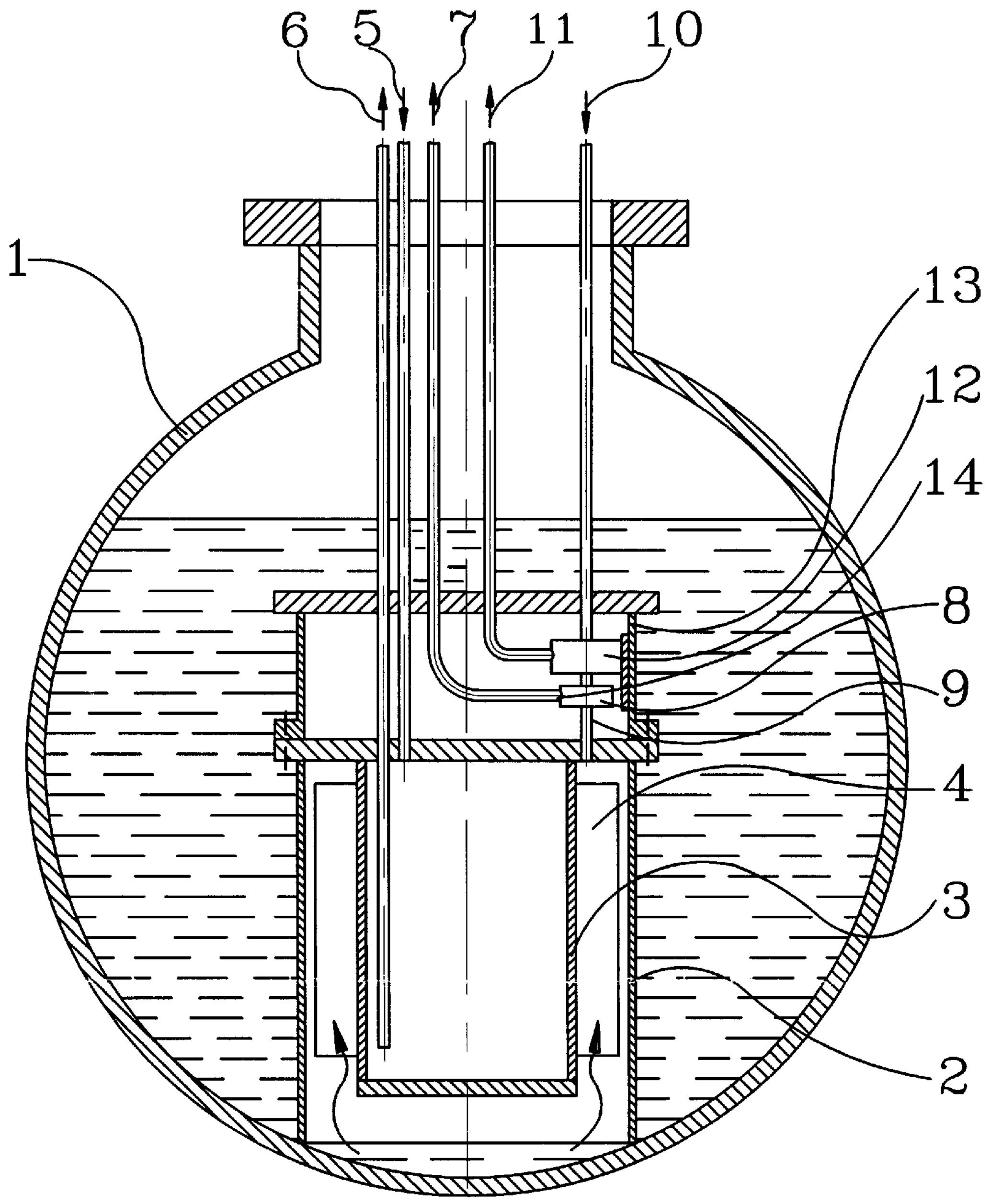

As can be seen from FIG. 1, a device for storing and discharging viscous liquids includes an outer tank which is identified with reference numeral 1. A viscous liquid for example a heavy fuel oil is stored in the tank 1. The device further has an outer tubular element which is preferably bell-shaped. In other words, the outer tubular element 2 has a tubular lateral shell and an upper cover which closes the shell from the above. The tubular element 2 is located in the interior of the tank 1. The device further has an inner tubular element 3 which is closed by the above mentioned cover of the outer tubular element 2. It is also closed from below by an additional bottom, and is closed sideways by the lateral wall. The space between interior of the outer tubular element 2 forms a chamber for heavy fuel oil, while the interior of the inner tubular element 3 forms a chamber for a heating medium.

The device is provided with a plurality of heat conductive fins 4 which are arranged on the outer circumferential surface of the lateral circumferential wall of the inner tubular element 3. They extend substantially radially toward the lateral circumferential wall of the outer tubular element 2 and are spaced from one another in the circumferential direction. A supply conduit 5 supplies a heating medium, for example steam, heating liquid, etc. into the heating medium chamber in the interior of the inner tubular element 3. A discharge conduit 6 withdraws condensate (if the heating medium is steam) or a liquid cooled due to the heat exchange with the cold heavy fuel oil (if the medium is hot liquid), etc. A heavy fuel oil discharge conduit 7 is used to withdraw oil from the inner chamber of the outer tubular element 2 and therefore from the tank 1. A corresponding device is provided for circulating the heating medium, which is known per se and therefore is not shown in the drawing.

The device in accordance with the present invention is further provided with pump 8 which has a suction inlet 9. The suction inlet directly communicates with a space between the outer tubular element 2 and the inner tubular element 3 which is filled with viscous liquid. In particular, the suction inlet of the pump 8 can communicate with the above mention space through an opening in the cover of the outer tubular element 2. A pump drive is provided with a line 10 for supplying compressed air, and a line 11 for withdrawing exhaust air. The pump drive can be a known motor drive 12. The drive 12 is formed so that it does not cause sparks or explosion of gases which can form in the upper part of the tank. The pump 8 together with the motor drive 12 are accomodated in an additional tubular element 13 which is mounted on the outer tubular element 2 and connected with the latter for example by screws. A pressure outlet of the pump 8 is connected with the discharge conduit 7. As can be seen from the drawings, the pump 8 together with a motor drive 12 are enclosed in an additional tubular element 14 which is mounted on the outer tubular element 2 and can be connected with the latter, for example by screws.

The device operates in the following manner:

The heavy fuel oil is stored in the tank 1 and fills the space between the tubular elements 2 and 3. When it is necessary to withdraw heavy fuel oil from the tank, it has to be heated. The heating medium is supplied through the heating medium supply conduit 5 into the interior of the tubular element 3. It gives out heat to the lateral circumferential wall of the tubular element 3 and to the fins 4. The heat is further transferred into the heavy fuel oil which is warmed up and its viscosity is reduced as a result of the warming up. The heavy fuel oil is then is sucked by the pump 8 through the suction inlet 9 and pumped through the pressure outlet 14 of the pump into the discharge conduit 7, to be withdrawn outwardly of the tank 1.

It will be understood that each of the elements described above, or two or more together, may also find a useful application in other types of constructions differing from the types described above.

While the invention has been illustrated and described as embodied in device for storing and discharging viscous liquids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for storing and discharging a viscous liquid for a tank which is adapted to accommodate a viscous liquid, the device comprising:

an outer tubular element adapted to be arranged inside the tank and open into its interior so that the viscous liquid fills a space inside said outer tubular element;

an inner tubular element located inside an inner chamber of said outer tubular element and being substantially closed;

means for supplying the viscous liquid into said outer tubular element and discharging liquid from said outer tubular element;

means for supplying a heating medium into said inner tubular element so that the heating medium inside said inner tubular element gives out heat through a wall of said inner tubular element into the inner chamber of said outer tubular element and therefore to the viscous liquid so as to heat the viscous liquid and to reduce its viscosity, and for discharging the heating medium which has been cooled as a result of giving off the heat;

said means for discharging the liquid from said outer tubular element including pump means having a suction inlet which is directly connected with a space between said outer tubular element and said inner tubular element so as to suck the viscous liquid from said space, said pump means being lowerable together with said outlet tubular element and said inner tubular element substantially to a bottom of the tank.

2. A device as defined in claim 1, wherein said means for discharging the liquid from said outer tubular element include a discharge pipe, said pump means having an outlet connected with said discharge pipe.

3. A device as defined in claim 1; and further comprising a motor drive for driving said pump means, said motor drive being lowerable together with said pump means and said outer tubular element and said inner tubular element.

4. A device as defined in claim 3; and further comprising an additional tubular element which covers said pump means and said drive and is connected with said outer tubular element.

* * * * *